US012378846B2

(12) United States Patent
Rycroft et al.

(10) Patent No.: US 12,378,846 B2
(45) Date of Patent: Aug. 5, 2025

(54) AUTONOMOUS ULTRAVIOLET LIGHT AND BRUSH APPARATUS FOR REMEDIATION AND PREVENTION OF BIOLOGICAL AND CHEMICAL FOULING IN WELLS

(71) Applicant: United States of America as Represented by The Secretary of the Army, Alexandria, VA (US)

(72) Inventors: Taylor E Rycroft, Concord, MA (US); Zachariah E Tomberg, Barre, VT (US); Griffin Donohue, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 18/476,241

(22) Filed: Sep. 27, 2023

(65) Prior Publication Data

US 2025/0101833 A1 Mar. 27, 2025

(51) Int. Cl.

| | |
|---|---|
| ***E21B 37/00*** | (2006.01) |
| ***B08B 7/00*** | (2006.01) |
| ***B08B 7/04*** | (2006.01) |
| ***B08B 17/02*** | (2006.01) |
| ***E21B 19/02*** | (2006.01) |
| ***E21B 19/084*** | (2006.01) |

(52) U.S. Cl.

CPC ............ *E21B 37/00* (2013.01); *B08B 7/0057* (2013.01); *B08B 7/04* (2013.01); *B08B 17/02* (2013.01); *E21B 19/02* (2013.01); *E21B 19/084* (2013.01)

(58) Field of Classification Search

CPC .......... E21B 37/00; E21B 37/02; E21B 37/04; E21B 37/045; E21B 37/06

See application file for complete search history.

(56) References Cited

U.S. PATENT DOCUMENTS

| | | | | |
|---|---|---|---|---|
| 6,722,442 B2 * | 4/2004 | Simpson | F16L 55/26 | 166/173 |
| 2002/0108751 A1 * | 8/2002 | Simpson | E21B 37/045 | 166/212 |
| 2004/0045474 A1 * | 3/2004 | Simpson | E21B 23/08 | 104/138.2 |
| 2005/0016302 A1 * | 1/2005 | Simpson | E21B 23/14 | 73/865.8 |
| 2010/0307760 A1 * | 12/2010 | Shouse | E21B 33/072 | 166/339 |
| 2014/0060844 A1 * | 3/2014 | Barbour | E21B 37/00 | 166/311 |

(Continued)

*Primary Examiner* — David Carroll
(74) *Attorney, Agent, or Firm* — Brian C Jones

(57) ABSTRACT

In one embodiment, a system for cleaning a well includes (i) an ultraviolet (UV) light emitting device and/or (ii) a first brush connected with an abrasion device motor to drive the first brush in rotation around a longitudinal axis of the first brush. A cable reel and a cable are connected with (i) the UV light emitting device to power the UV light emitting device, to lower the UV light emitting device into the well, and to raise the UV light emitting device from the well; and/or (ii) the first brush and the abrasion device motor, to power the abrasion device motor, to lower the first brush and the abrasion device motor into the well, and to raise the first brush and the abrasion device motor from the well.

14 Claims, 12 Drawing Sheets

(56) References Cited

U.S. PATENT DOCUMENTS

| | | | | |
|---|---|---|---|---|
| 2017/0159384 | A1* | 6/2017 | Romer | E21B 4/18 |
| 2018/0202269 | A1* | 7/2018 | Wensrich | E21B 37/00 |
| 2020/0284112 | A1* | 9/2020 | Fanini | E21B 37/00 |

* cited by examiner

AUTONOMOUS ULTRAVIOLET LIGHT AND BRUSH APPARATUS FOR REMEDIATION AND PREVENTION OF BIOLOGICAL AND CHEMICAL FOULING IN WELLS

STATEMENT OF GOVERNMENT INTEREST

Under paragraph 1 (a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to systems and methods of cleaning wells and, more specifically, to systems and methods for physical and chemical remediation and prevention of biological and chemical fouling in wells.

Description of the Related Art

This section introduces aspects that may help facilitate a better understanding of the invention. Accordingly, the statements of this section are to be read in this light and are not to be understood as admissions about what is prior art or what is not prior art.

Pressure relief wells relieve subsurface hydrostatic pressures which may develop within the pervious foundations of dams, levees, and hydraulic structures. All water retention structures are subject to seepage through their foundations and abutments. In many cases the seepage may result in excess hydrostatic pressures or uplift pressures beneath elements of the structure or landward strata. Relief wells are often installed to relieve these pressures which might otherwise endanger the safety of the structure. Relief wells, in essence, are nothing more than controlled artificial springs that reduce pressures to safe levels and prevent the removal of soil via piping or internal erosion.

Fouling in relief wells is chiefly attributed to chemical ("cementation or incrustation") and biological ("biofouling") action. The most commonly reported chemical incrustations are calcium carbonates, iron (iron oxyhydroxides and iron sulfides), manganese hydroxides, and products of decomposition from lignite beds. Biofouling is most commonly caused by iron-, manganese-, and/or sulfur-oxidizing bacteria; these organisms are present in some concentrations in nearly all shallow-depth freshwater wells in North America and their abundance is a function of environmental conditions including oxidation-reduction potential (ORP or Eh), pH, temperature, and dissolved concentrations of iron and other substances.

Physical fouling, such as "silting in," may also occur, and results when very fine material migrates into the filter material, clogging it or reducing its conductivity; this may be caused by improper or incomplete well development, bridging of filter material during installation and subsequent separation, extreme over-pumping, or incorrect filter design. This mechanical contamination of relief wells by silts, clays, or other particulate media entering the filter pack either from the formation or through the top of the well is usually difficult to determine except as indicated by periodic pumping tests.

Chemical incrustation of the well screen, filter pack, and surrounding formation soils can be a major factor in specific capacity reduction with time. Chemical deposits within the screen openings reduce their effective open area and cause increased head losses. Deposits in the filter pack and surrounding soils reduce their permeability and also increase head losses. The occurrence of chemical incrustation is determined chiefly by water quality. The type and amount of dissolved minerals and gases in the water entering the well determine the tendency to deposit mineral matter as incrustations. Common indicators of incrusting waters are: $pH>7$; total $Fe>2$ ppm; total $Mn>1$ ppm in conjunction with high pH and presence of $O_2$; and total carbonate hardness$>300$ ppm.

SUMMARY

The present invention was developed to address the desire for a safer and more efficient, effective, and economically feasible way of addressing biological and chemical fouling in wells.

Embodiments of the invention are directed to an apparatus that integrates a single or multiple ultraviolet-C (UVC)-emitting lamps with a single or multiple spinning, rotating, oscillating, or vibrating abrasion devices such as brushes to facilitate both physical and chemical removal of biofilm and chemical scale on the interior screen and casing of a well. The UVC/abrasion or UVC/brush apparatus may be raised and lowered in the well at a programmable rate to administer the target dose of UV-C irradiation and ozone production as well as adequate brush contact time.

It is known to use UV (ultraviolet) light and/or ozone to treat harmful algal blooms and detoxify liquid and solid materials containing toxic organic compounds. UVC has been used as germicidal radiation. It operates on the key disinfection mechanism of causing damage to nucleic acids leading to disruption or inactivation of microorganisms. Ozone is a very strong chemical oxidant. Its key disinfection mechanism is direct oxidation or destruction of the microbial cell wall or membrane.

Biofilms in relief wells are more challenging to disinfect and/or inactivate than planktonic organisms. Biofilms are highly organized 3D structures where microorganisms are embedded in a self-produced complex matrix made of extracellular polymeric substances. For example, free-swimming bacteria can reversibly attach to different types of surfaces as planktonic bacteria. The bacteria transition from reversible to irreversible attachment due to EPS production in an auto-aggregation process. Early development of biofilm architecture results in a stable supercellular structure. Later development of micro-colonies results in growth where secondary colonization by multiple species can occur. Mature biofilms are characterized by complex 3D structures. Extracellular polymeric substances (EPS) are protective against many chemical treatments.

Embodiments of the invention provide methods and systems for inactivating microorganisms in the established biofilm, causing biofilm slough, and inhibiting biofilm formation, as well as oxidizing or precipitating chemical foulants or encrusting agents. In a broad sense, cleaning a well may include not only physically removing biofilm and chemical scale from the interior surface of the well, but also inactivating microorganisms and inhibiting biofilm formation, and oxidizing or precipitating chemical foulants or encrusting agents and inhibiting chemical encrustation or scale formation. The systems and methods of the invention may achieve both remediation and prevention of biological and chemical fouling in the well.

According to an aspect the present invention, a system for cleaning a well includes at least one of (i) an ultraviolet (UV) light emitting device or (ii) a first brush connected with an abrasion device motor to drive the first brush in rotation around a longitudinal axis of the first brush. A cable reel and a cable are connected with at least one of (i) the UV light emitting device to power the UV light emitting device, to lower the UV light emitting device into the well, and to raise the UV light emitting device from the well; or (ii) the first brush and the abrasion device motor, to power the abrasion device motor, to lower the first brush and the abrasion device motor into the well, and to raise the first brush and the abrasion device motor from the well.

In accordance with another aspect of the invention, a method for cleaning a well comprises: lowering, into the well, at least one of (i) an ultraviolet (UV) light emitting device or (ii) a first brush which is connected with an abrasion device motor to drive the first brush in rotation around a longitudinal axis of the first brush, using a cable connected with at least one of (i) the UV light emitting device or (ii) the first brush and the abrasion device motor; and performing at least one of (i) emitting UV light from the UV light emitting device while moving the UV light emitting device up and down along a depth of the well, or (ii) driving the first brush in rotation around the longitudinal axis of the first brush while moving the first brush and the abrasion device motor up and down along the depth of the well.

In accordance with yet another aspect of the invention, a system for cleaning a well comprises an ultraviolet (UV) light emitting device; a first abrading device connected with the UV light emitting device; and an abrasion device motor connected to the first abrading device to drive the first abrading device to abrade an interior surface of the well. An electrical cable is connected with the UV light emitting device and the first abrading device to lower the UV light emitting device and the first abrading device into the well and raise the UV light emitting device and the first abrading device from the well, and to supply electrical power to the UV light emitting device and the abrasion device motor.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
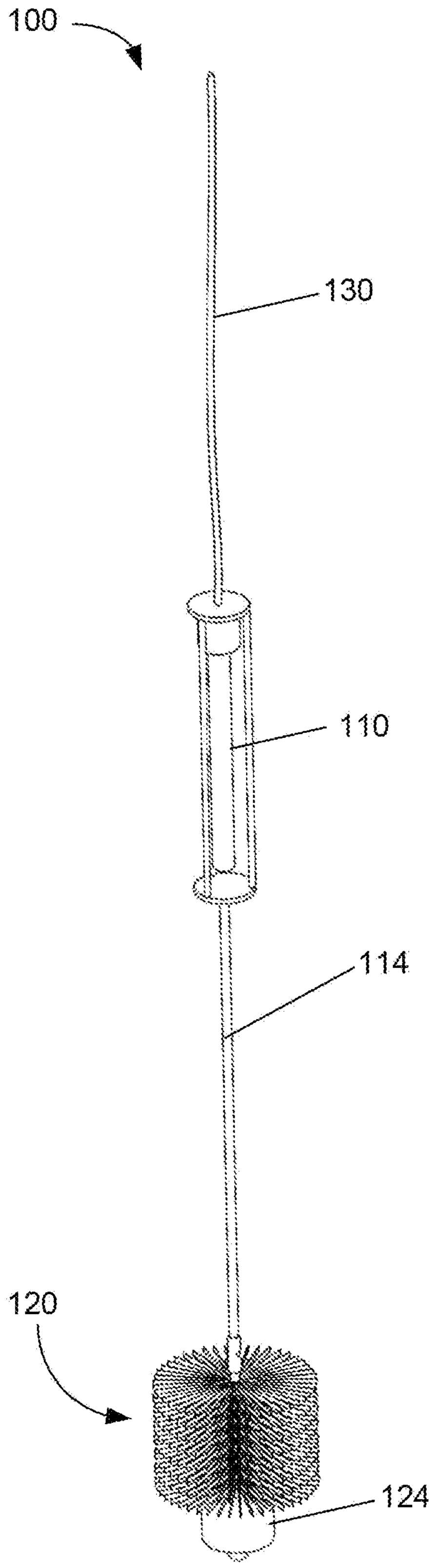
FIG. 1 is a perspective elevational view illustrating an example of a UVC/abrasion or UVC/brush apparatus for cleaning a well.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

When a well cannot meet its design flow rate, it may require rehabilitation, a process that has been estimated to cost in the vicinity of $6,000-$24,000 per well depending on well diameter, depth, and degree of fouling. This process is entirely manual, potentially dangerous to personnel depending on the treatment method employed (e.g., hazardous chemicals), and often short-lived—it is common for well performance improvements to deteriorate as recolonization or regrowth occurs in weeks to months.

One feature of the present invention is to significantly reduce cost, increase efficacy, improve safety, and entirely remove the manual component of well rehabilitation through the use of an autonomous, programmable UVC/abrasion or UVC/brush apparatus for remediation and prevention of biological and chemical fouling in wells. The apparatus integrates a single or multiple ultraviolet-C (UVC)-emitting lamps with a single or multiple spinning, oscillating, or vibrating brushes to facilitate both physical and chemical removal of biofilm and chemical scale on the interior screen and casing of a well. The UVC lamp emits UVC radiation at least one of two wavelengths: 185 nm and 254 nm. The 185 nm wavelength is responsible for generating dissolved ozone within the well water, which can react with and oxidize chemicals and microorganisms that cause or have already caused fouling, thereby destroying existing fouling and preventing future fouling. The 254 nm wavelength is responsible for germicidal action against living organisms; it kills or inactivates the free-swimming (planktonic) or surface-associated (biofilm) biota, thereby destroying existing fouling and preventing future fouling. The brushes used in the apparatus may be metal or polymer-based brushes with a diameter equivalent to that of the well. The brushes spin, rotate, oscillate, or vibrate using a step motor and clean the scale and biofilm from the well's interior screen and casing by abrasive action. The UVC/brush apparatus is raised and lowered at a programmable rate to administer the target dose of UV-C irradiation and ozone production. Raising and lowering is performed by a cord reel at the top surface of the well, powered electrically by a generator, solar panel, direct link to the grid, or other power source. The cable that is extended or reeled-in down-well is a subsea electrical cable that provides both electrical conductivity to the apparatus and tensile support. It is sleeved in Kevlar® to provide additional tensile support. After a simple initial setup, the system operates entirely autonomously without any human intervention and can be left to operate in the well indefinitely. Depending on the biogeochemical profile of the well, maintenance such as cleaning the lamp and brushes may be performed periodically.

In terms of efficacy, the combination of chemical and physical one-time treatments has shown to be effective for short-term rehabilitation of wells. In contrast to one-time treatments, this apparatus performs chemical (ozone) and physical (UV at 254 nm, brush) treatment continuously and is intended to stay in a well indefinitely (but can be used for very short treatment periods, if desired) which is expected to improve the longevity of well rehabilitation by employing continuous prevention.

With regard to safety, the use of UVC to generate anti-microbial radiation (254 nm) and a potent chemical oxidant (ozone) down-well and away from any personnel is a major advantage. No hazardous chemicals or heavy or dangerous equipment are required to remediate or prevent fouling in the well, as opposed to the current procedures.

Regarding autonomy, after initial setup, the system operates entirely autonomously without any human intervention.

As to cost, a goal is to develop the apparatus at a cost of $2,000 with minimal operation power requirements, with an expected total cost that is significantly less than the current cost of rehabilitating a well through conventional means ($6,000-$24,000 per well).

Figure 2:
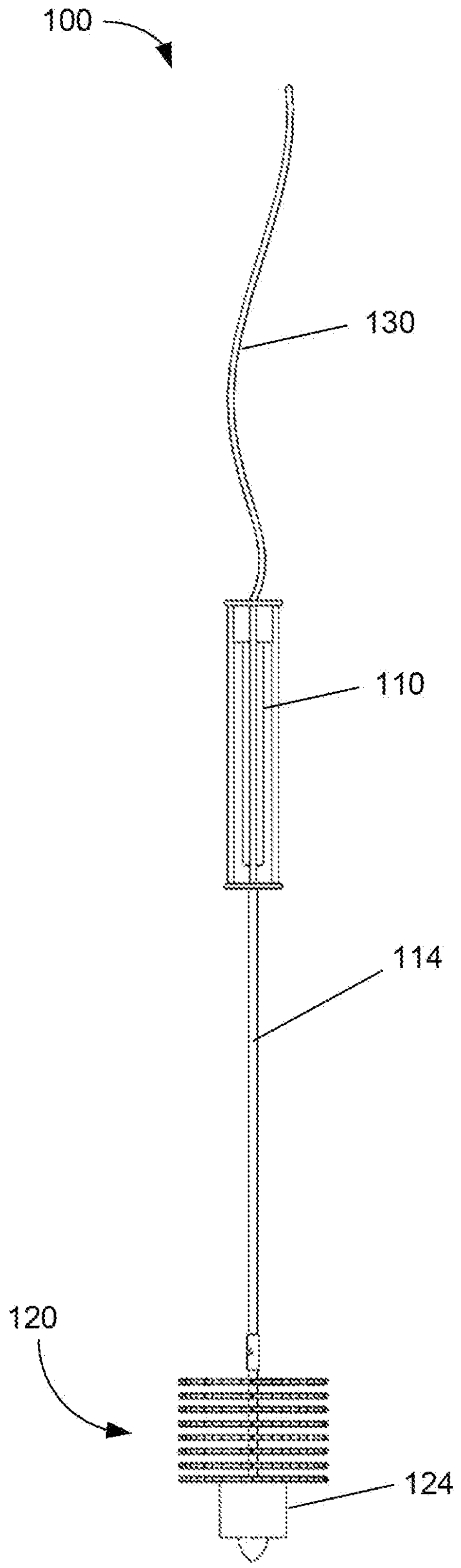
FIG. 2 is an elevational view illustrating the UVC/brush apparatus of FIG. 1.

FIG. 1 is a perspective elevational view illustrating an example of a UVC/abrasion or UVC/brush apparatus for cleaning a well. FIG. 2 is an elevational view illustrating the UVC/brush apparatus 100 of FIG. 1. The UVC/brush apparatus 100 includes a UV device or UV emitting device 110, a shaft 114 connecting the UV device 110 to an abrading device 120 such as a brush and a rotating, vibrating, or sonicating device 124 such as a vibrating motor.

The UV device 110 may include a UV lamp, a quartz sleeve, and an electrical ballast. The UV device 110 emits UV-C radiation to remove and prevent the formation of biofilm and chemical scale on the interior screen and casing of a well. The UV device may emit UV at 185 nm wavelength to produce dissolved ozone within the well water for reacting with and oxidizing chemicals and microorganisms and/or at 254 nm wavelength to cause germicidal action against living organisms by DNA disruption. The UV device 110 may be a commercially available product such as the LMX13 Barnstead Lamp (185/254 nm) available from multiple distributors.

The abrading device 120 includes a circular cylindrical wire brush having a diameter equal to or slightly less than (e.g., 1% or 2% or up to 3% less) the diameter of the well. It may have any suitable height. To achieve effective brushing for removing biofilm buildup while keeping the overall height of the UVC/brush apparatus 100 at a minimum to control or optimize its size and weight, the height of the brush 120 is typically 0.5 to 1 time its diameter. The brush 120 may be made of any suitable material including metals such as stainless steel and polymers such as high-density polyethylene. The brush 120 may be a commercially available product such as a chimney cleaning brush available from Rutland.

An electrical wire or cord or cable 130 supplies electrical power to the UV device 110 to emit UV light and to the vibrating device 124 to vibrate the abrading device 120. The vibrating device 124 may be configured to generate vibration at frequencies from 100 Hz up to 500 Hz, or about 250 Hz (±10%). The vibrating device 124 may cause vibration in a variety of ways or orientations including, for example, longitudinal oscillation along the shaft 114, rotational oscillation around the shaft 114, laterally oscillation perpendicular to the shaft 114, or multiple vibrations and/or oscillations in random directions. The vibration causes the abrading device 120 to abrade or scape the interior surface of the well for removing biofilm buildup, scale, or the like. The vibrating device 124 may be a vibrating motor that is commercially available from numerous suppliers.

The electrical cable 130 serves dual purposes. It not only supplies power to operate the UVC/brush apparatus 100 but mechanically bears the weight of the apparatus 100 (including the UV device 110 and the abrading device 120) as it is lowered into and raised from the well. An example is a commercially available high-temperature polyurethane subsea cable available from BlueRobotics. For increased strength, the electrical cable 130 may include a sleeve. An example is a commercially available Kevlar® expandable braided sleeving available from CableOrganizer. The UVC/brush apparatus 100 is designed to operate at as low a power level as required for effective removal of biofilm and chemical scale. The input power level may be 60 W to 120 W or about 90 W (±10%).

Figure 3:
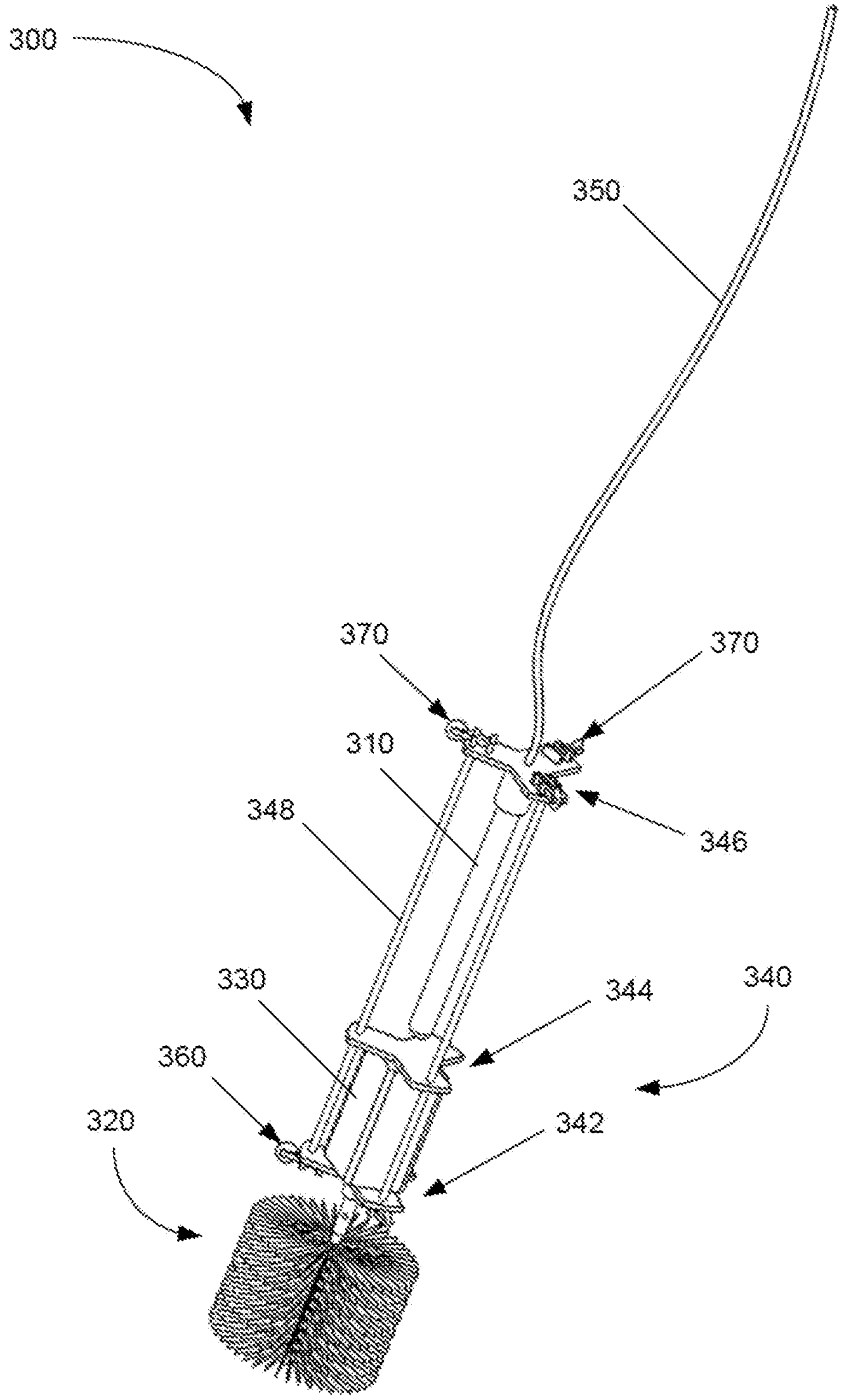
FIG. 3 is a perspective view illustrating another example of a UVC/brush apparatus for cleaning a well.
Figure 4:
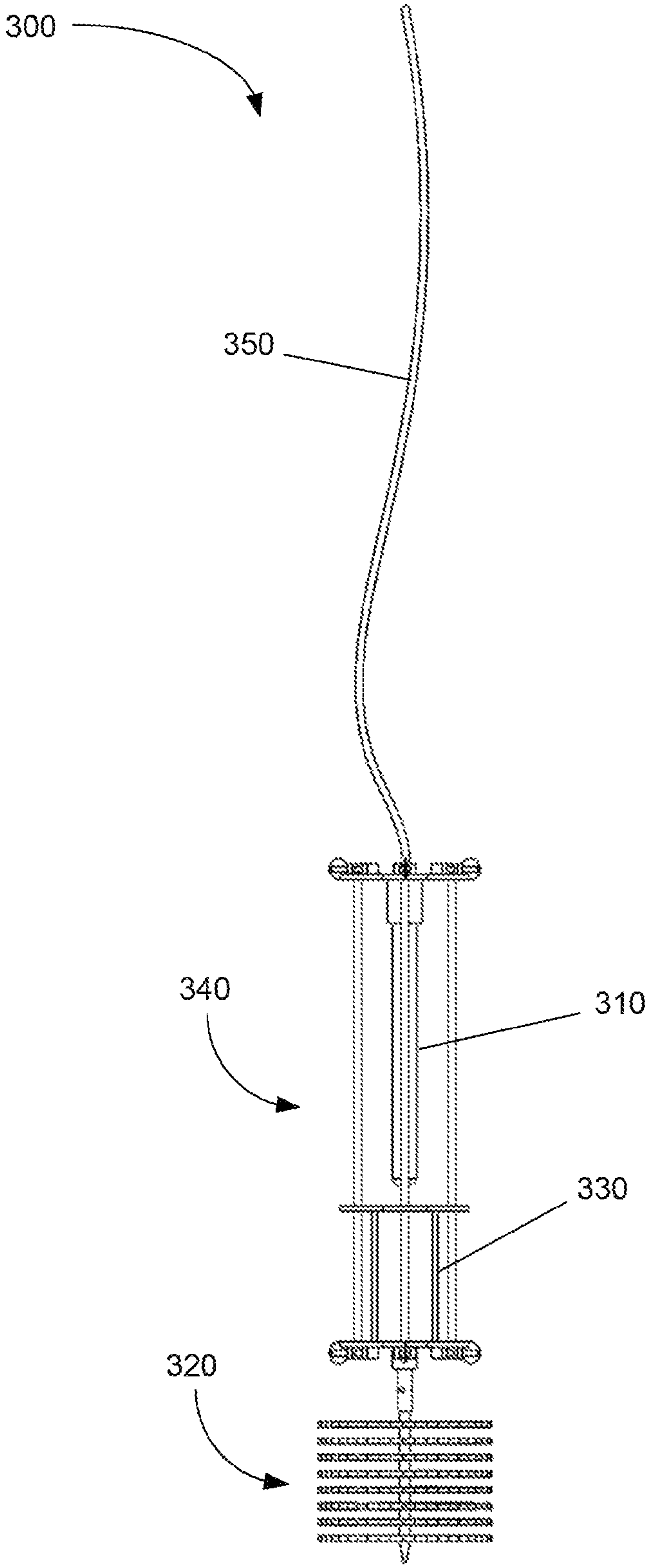
FIG. 4 is an elevational view illustrating the UVC/brush apparatus of FIG. 3.

FIG. 3 is a perspective view illustrating another example of a UVC/brush apparatus for cleaning a well. FIG. 4 is an elevational view illustrating the UVC/brush apparatus of FIG. 3. The UVC/brush apparatus 300 includes a UV device 310, an abrading device 320 such as a brush, and a drive mechanism 330 such as a stepper motor configured to drive the abrading device 320 in rotation around the longitudinal axis of the apparatus 300 which coincides with the longitudinal axis of the abrading device 320. A frame 340 is connected with the UV device 310, the abrading device 320, and the drive mechanism 330 to provide structural support. In the embodiment shown, the frame 340 includes a first (bottom or distal) plate 342, a second (middle) plate 344, and a third (top or proximal) plate 346, which are connected by a plurality (e.g., three) of connecting members (such as rods or bars) 348. An electrical cable 350 supplies electrical power to the UV device 310 to emit UV light and to the drive mechanism 330 to rotate and/or vibrate the abrading device 320. The electrical cable 350 not only supplies power to operate the UVC/brush apparatus 300 but mechanically bears the weight of the apparatus 300 (including the UV device 310, the abrading device 320, and the drive mechanism 330) as it is lowered into and raised from the well.

An optional plurality of first (bottom or distal) indexing wheels 360 are provided at the periphery of the first (bottom or distal) plate 342. The distance from the outer edges of the first indexing wheels 360 to the longitudinal axis of the UVC/brush apparatus 300 which coincides with the center of the first plate 342 is equal to or slightly less than (e.g., within 2% or within 1% of) the radius of the well. The first indexing wheels 360 make contact with the inner surface of the well to center the apparatus 300 and, optionally, to inhibit or reduce rotation of the first plate 342 due to the orientation of the first indexing wheels 360 to roll upward and downward. Similarly, an optional plurality of third (top or proximal) indexing wheels 370 are provided at the periphery of the third (top or proximal) plate 346. The distance from the other edges of the third indexing wheels 370 to the longitudinal axis of the UVC/brush apparatus 300 which coincides with the center of the third plate 346 is equal to or slightly less than (e.g., within 2% or within 1% of) the radius of the well. The third indexing wheels 370 make contact with the inner surface of the well to center the apparatus 300 and, optionally, to inhibit or reduce rotation of the third plate 346 due to the orientation of the third indexing wheels 370 to roll upward and downward.

Figure 5:
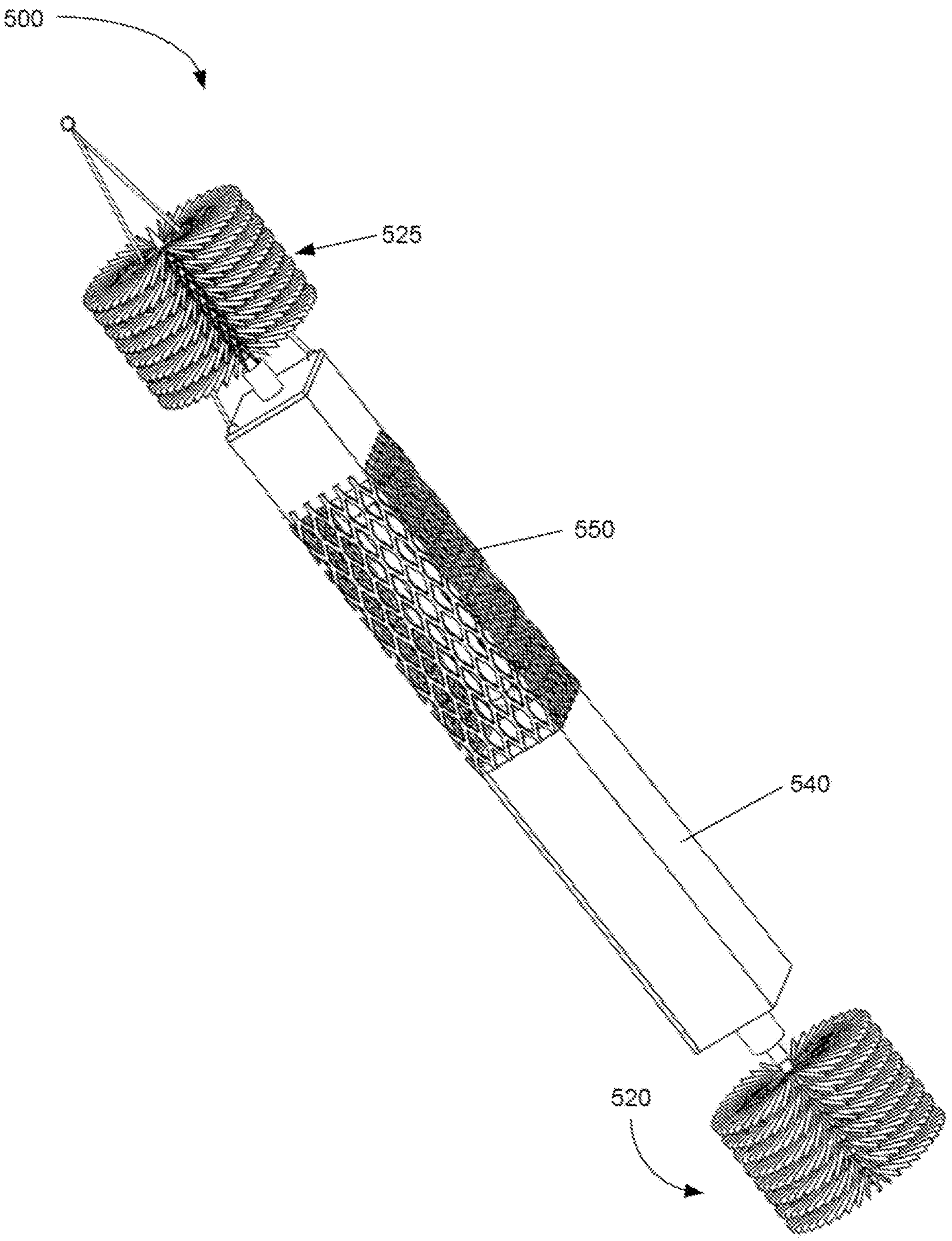
FIG. 5 is a perspective view illustrating another example of a UVC/brush apparatus for cleaning a well.
Figure 6:
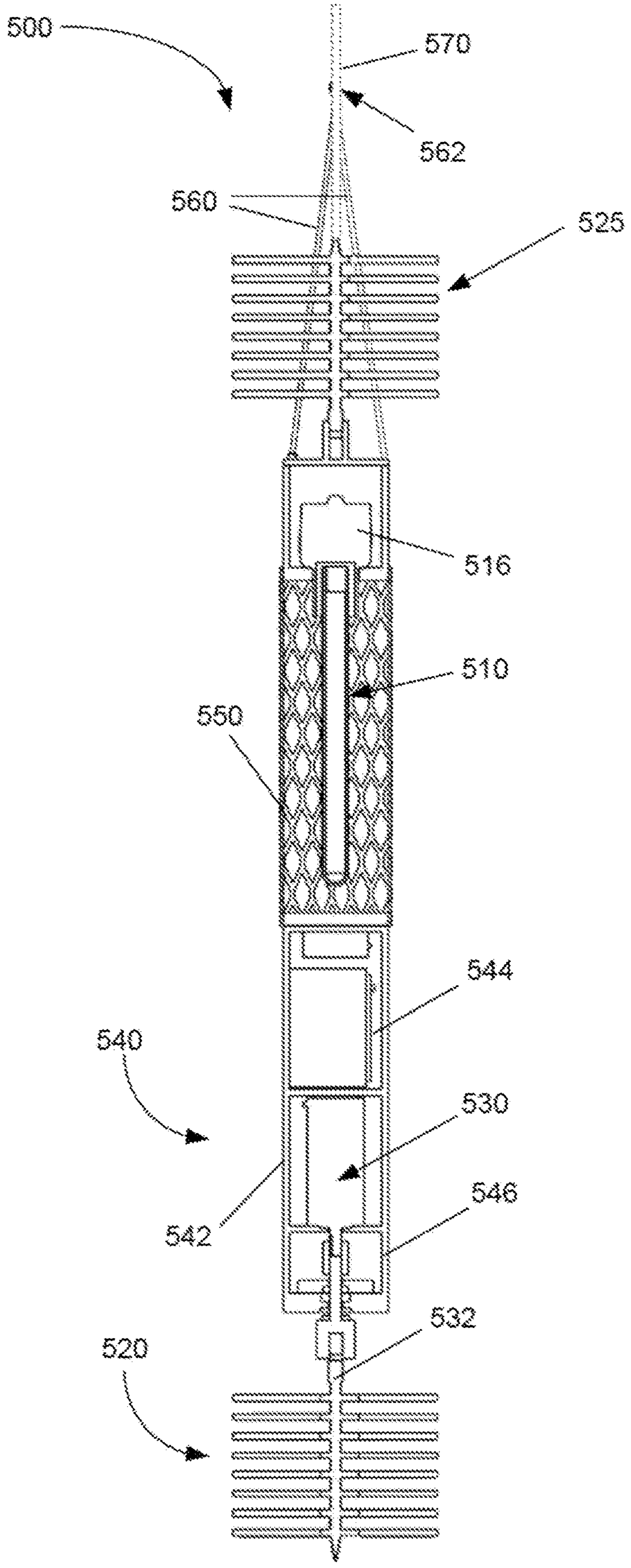
FIG. 6 is an elevational view illustrating the UVC/brush apparatus of FIG. 5.

FIG. 5 is a perspective view illustrating another example of a UVC/brush apparatus for cleaning a well. FIG. 6 is an elevational view illustrating the UVC/brush apparatus of FIG. 5. The UVC/brush apparatus 500 includes a UV device 510, a first (bottom or distal) abrading device 520 such as a first brush which may be a first wire brush, a second (top or proximal) abrading device 525 such as a second brush which may be a second wire brush, and a drive mechanism 530 such as a stepper motor configured to drive the first abrading device 520 in rotation around the longitudinal axis 532 of the apparatus 500 which coincides with the longitudinal axis of the first abrading device 520 and the longitudinal axis of the second abrading device 525. A drive mechanism frame or housing 540 houses the drive mechanism 530. In one embodiment as shown, the drive mechanism housing 540 includes a motor compartment 542 for housing an abrasion device motor such as a stepper motor 530, a driver control compartment 544 for housing a motor supply, a driver, and a controller, and a coupling compartment 546 for housing a brush shaft, a coupler, a shaft seal, and a rotary bearing. The stepper motor 530 may drive the first wire brush 520 in rotation around the longitudinal axis in oscillation by ±θ. The angle θ may be less than 540° or less than 360° or less than 180°. For instance, the first wire brush 520 may be rotated by ±450° to ±540°, or by ±270° to ±360°, or by ±90° to ±180°, or by ±90°. The second wire brush 525 is not directly driven, although it may also be directly driven in rotation and/or vibration in another embodiment. The second wire brush 525 may be similar in shape and size to, or the same in shape and size as, the first wire brush 520.

The UV device 510, which may include a UV lamp, a quartz sleeve, and an electrical ballast and power splitter 516, may be disposed in a UV device housing 550. In the embodiment shown, the UV device housing 550 includes an expanded metal housing which has a screen structure for UV light to pass therethrough. The UV device housing 550 is connected with the drive mechanism housing 540. A plurality of mounting wires 560 may be attached to the UV device housing 550 and converge at a wire mounting point 562.

An electrical cable 570 supplies electrical power to the UV device 510 to emit UV light and to the drive mechanism 530 to rotate and/or vibrate the first abrading device 520. The electrical cable 570 not only supplies power to operate the UVC/brush apparatus 500 but mechanically bears the weight of the apparatus 500 (including the UV device 510, the first abrading device 520, the second abrading device 525, and the drive mechanism 530) as it is lowered into and raised from the well. The electrical cable 570 may include a cable sleeve (e.g., Kevlar® expandable braided sleeving) for additional protection and strength.

Figure 7:
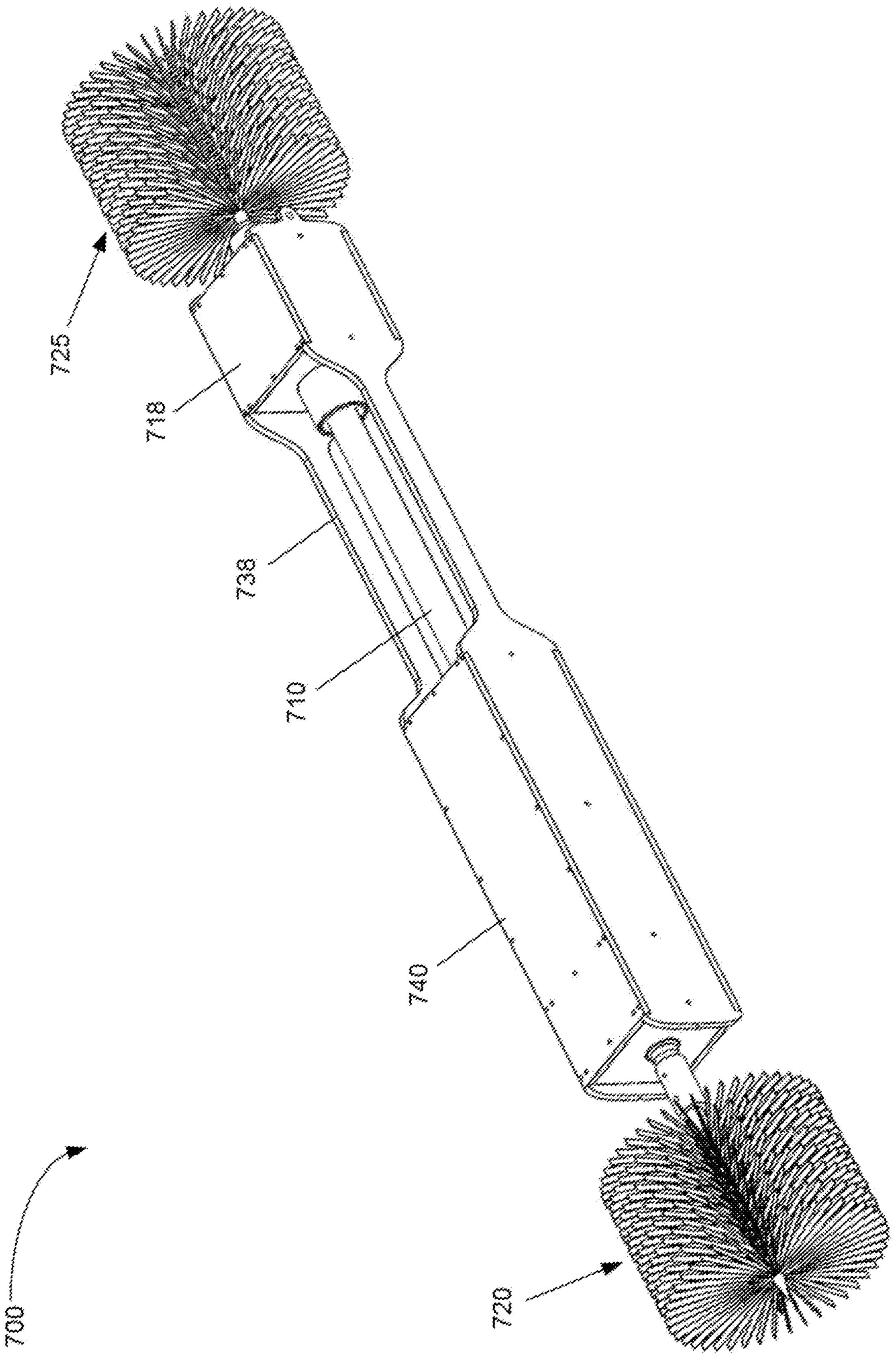
FIG. 7 is a perspective view illustrating another example of a UVC/brush apparatus for cleaning a well.
Figure 8:
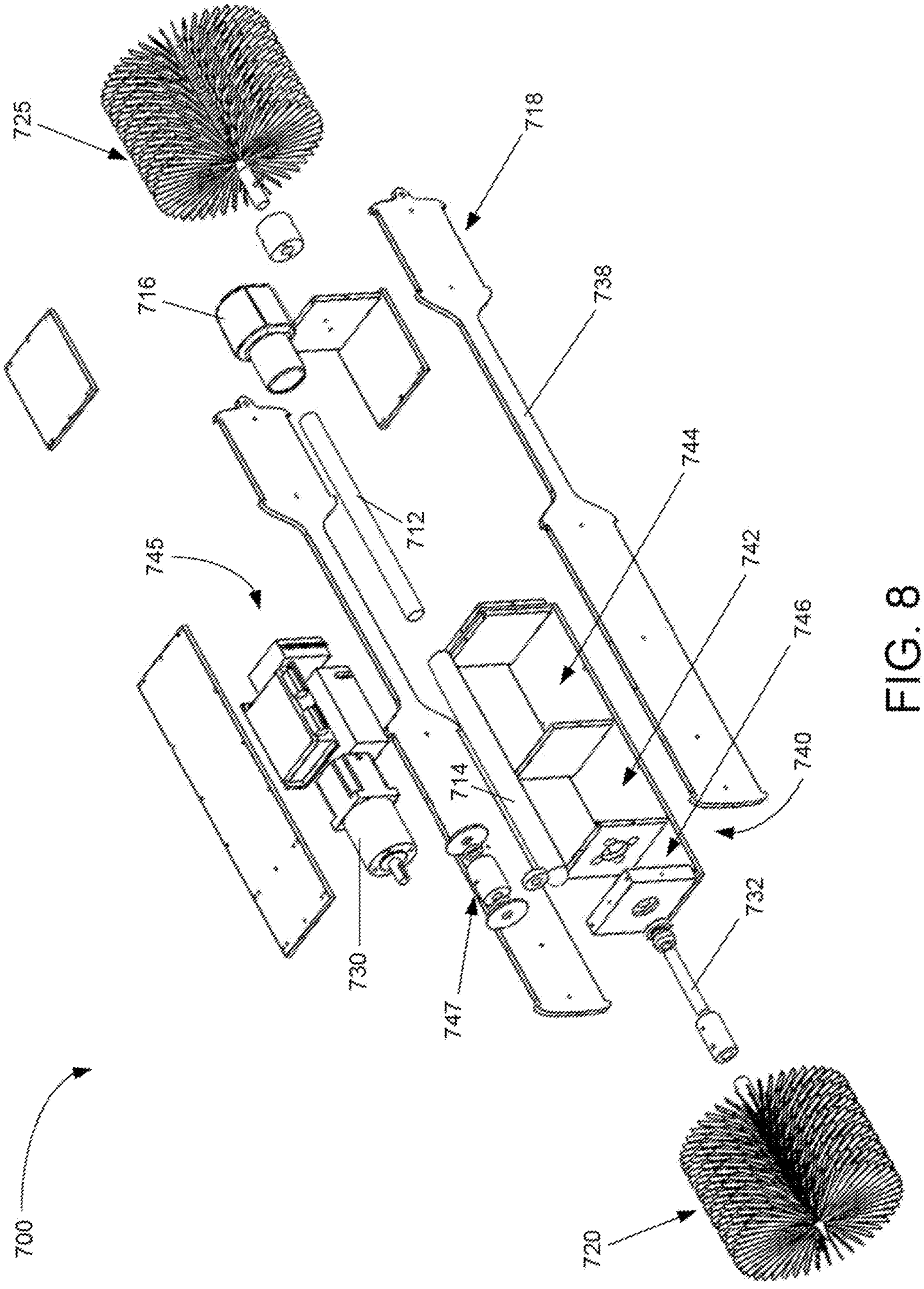
FIG. 8 is an exploded view illustrating the UVC/brush apparatus of FIG. 7.

FIG. 7 is a perspective view illustrating another example of a UVC/brush apparatus for cleaning a well. FIG. 8 is an exploded view illustrating the UVC/brush apparatus of FIG. 7. The UVC/brush apparatus 700 includes a UV device 710, a first (bottom or distal) abrading device 720 such as a first wire brush, a second (top or proximal) abrading device 725 such as a second wire brush, and a drive mechanism 730 such as a stepper motor configured to drive the first abrading device 720 in rotation around the longitudinal axis 732 of the apparatus 700 which coincides with the longitudinal axis of the first abrading device 720 and the longitudinal axis of the second abrading device 725. The UV device 710 includes a UV lamp 712, a quartz sleeve 714, and an electrical ballast and power splitter 716. The electrical ballast and power splitter 716 are disposed in a ballast housing 718. The UV lamp 712 may be a dichromatic UVC 185/254 nm lamp, a monochromatic UVC 254 nm lamp, a monochromatic UVC 185 nm lamp, or any other type of UV lamp. A drive mechanism frame or housing 740 houses the drive mechanism 730. The drive mechanism housing 740 is connected to the ballast housing 718 by connecting members 738 such as connecting plates or bars or rods. The connecting members 738 may be integrally formed with portions of the drive mechanism housing 740 and the ballast housing 718, each as a unitary structural piece. In one embodiment as shown, the drive mechanism housing 740 includes a motor compartment 742 for housing an abrasion device motor such as a stepper motor 730, a driver control compartment 744 for housing a motor supply, a driver, and a controller (collectively 745), and a coupling compartment 746 for housing a brush shaft, a coupler, a shaft seal, and a rotary bearing (collectively 747). The stepper motor 730 may drive the first wire brush 720 in rotation around the longitudinal axis in oscillation by ±θ, for instance, by ±450° to ±540°, or by ±270° to ±360°, or by ±90° to ±180°, or by ±90°. The first abrading device 720 is a rotating well-cleaning wire brush for physically cleaning the well.

An electrical cable supplies electrical power to the UV device 710 to emit UV light and to the drive mechanism 730 to rotate and/or vibrate the first abrading device 720. Similar to the electrical cables 350, 570 described above, the electrical cable not only supplies power to operate the UVC/brush apparatus 700 but mechanically bears the weight of the apparatus 700 (including the UV device 710, the first abrading device 720, the second abrading device 725, and the drive mechanism 730) as it is lowered into and raised from the well. It may include a cable sleeve (e.g., Kevlar® expandable braided sleeving) for additional protection and strength.

The second wire brush 725 is “stationary” or free or nondriven as a passive wire brush in that it is not power-driven directly to rotate or vibrate by a driving mechanism attached directly thereto, although it may also be directly driven in rotation and/or vibration in another embodiment. As the stepper motor 730 drives the first wire brush 720 in rotation, the rotational forces and displacements may be transmitted to the second wire brush 725, indirectly via its connection to the first wire brush 720 through the ballast housing 718, the connecting members 738, and the drive mechanism housing 740. As such, the second wire brush 725 may rotate and/or vibrate, to a lesser amount than the first wire brush 720, to remove biofilm and scale buildup in the well by abrasion. The nondriven second wire brush 725 serves an additional purpose of stabilizing the UVC/brush apparatus 700 by centering it and preventing it from over-rotation which may cause the electrical cable to be twisted and/or entangled to a degree that may interfere with the movement or operation of the apparatus 700.

Figure 9:
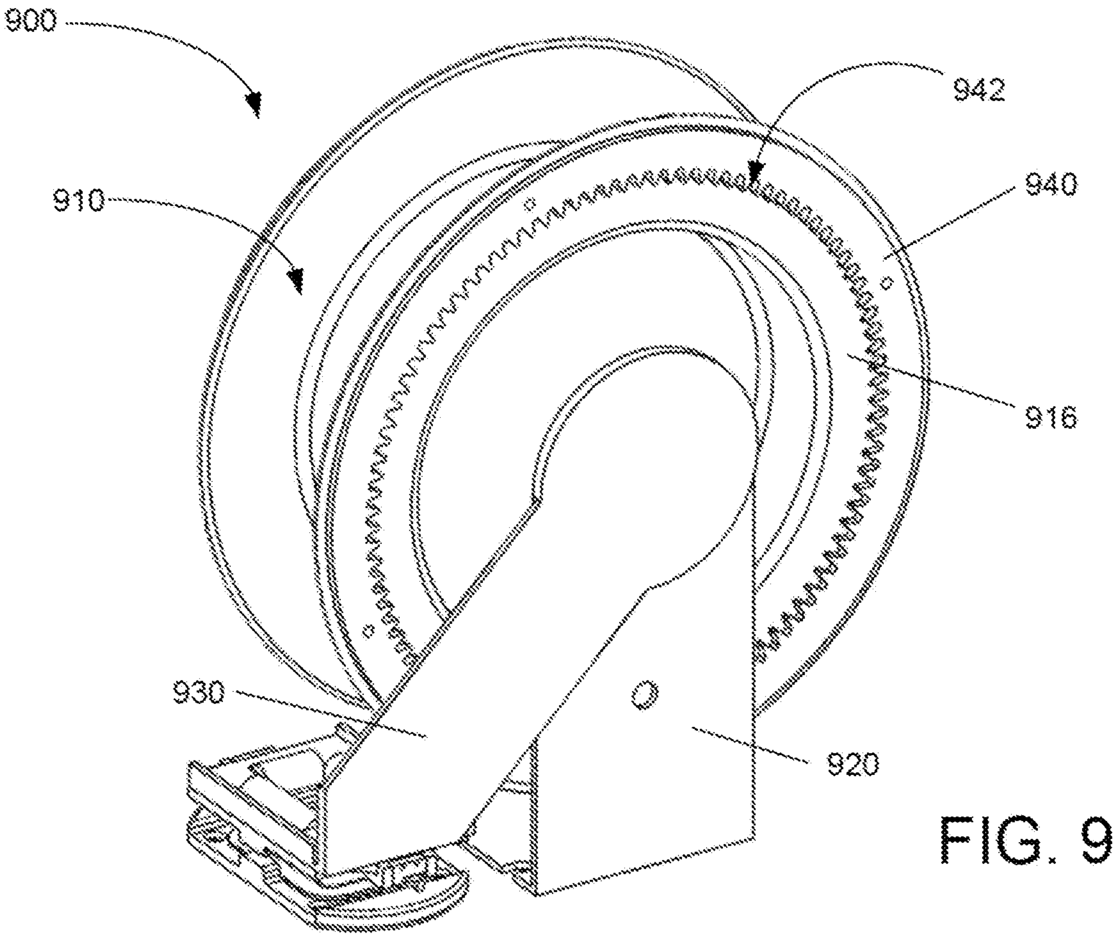
FIG. 9 is a perspective view illustrating an example of a cord reel system.
Figure 10:
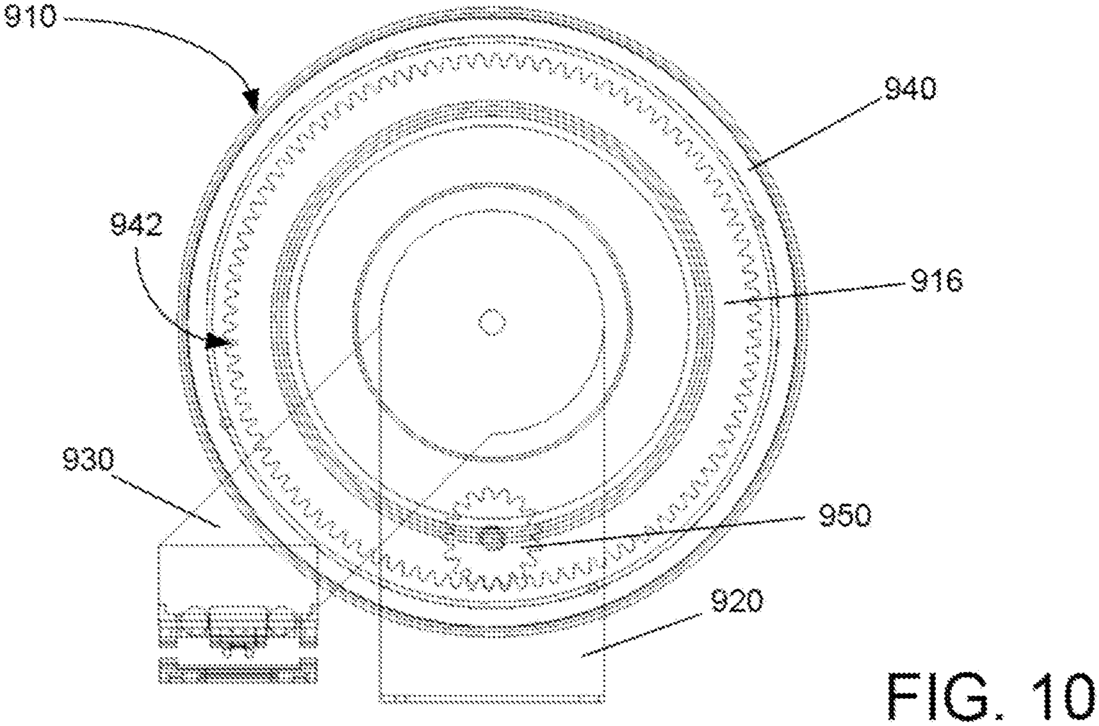
FIG. 10 is an elevational view illustrating the cord reel system of FIG. 9.
Figure 11:
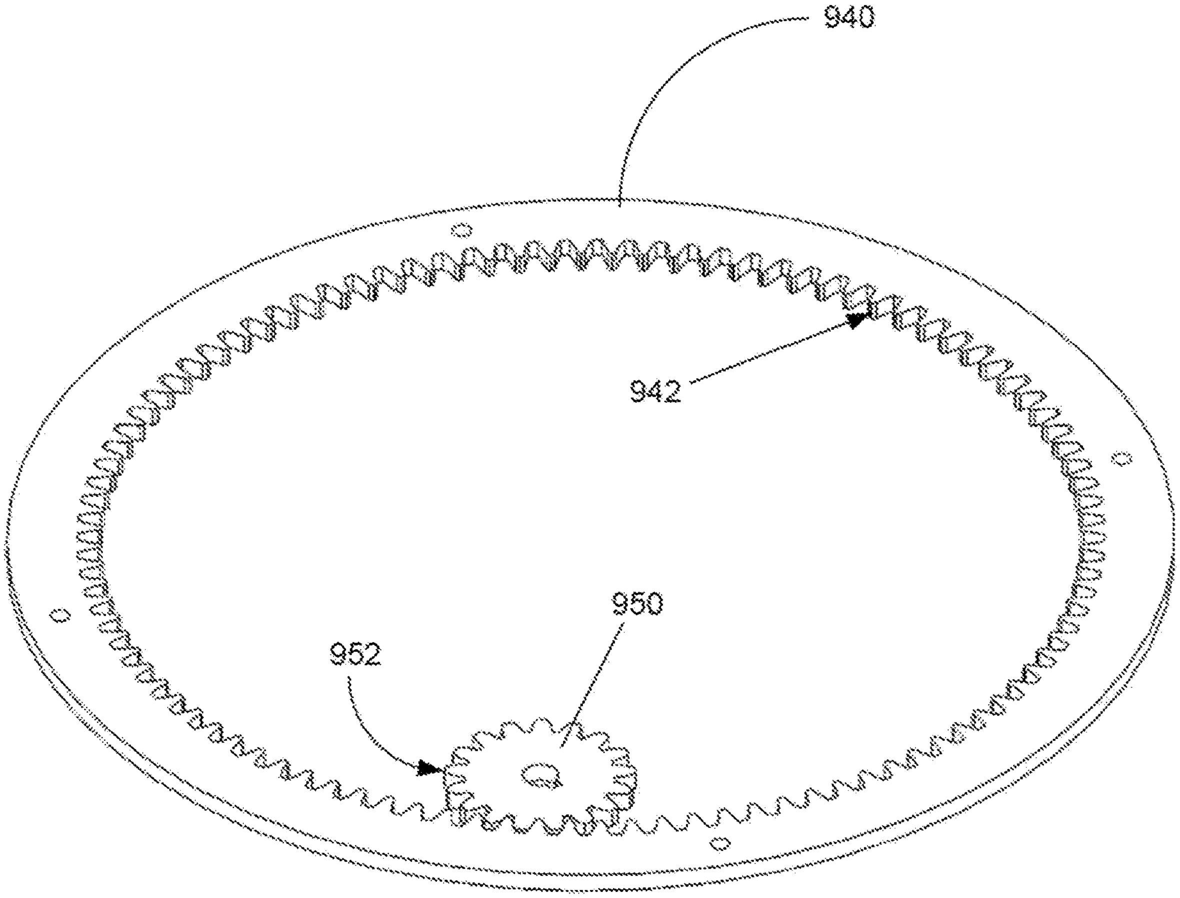
FIG. 11 is a perspective of a pinion and annular gear mechanism in the cord reel system of FIG. 9.

FIG. 9 is a perspective view illustrating an example of a cord reel system. FIG. 10 is an elevational view illustrating the cord reel system of FIG. 9. FIG. 11 is a perspective of a pinion and annular gear mechanism in the cord reel system of FIG. 9. The cord reel system 900 includes a reel or drum 910 having a pair of wall flanges 916, a base frame 920, and a guide arm 930. An annular gear 940 having annular gear teeth 942 is attached to a flange 916 and driven in rotation by a pinion 950 having pinion teeth 952. As the pinion 950 remains stationary in position and rotates in opposite directions, the cord reel system 900 rotates the annular gear 940 to extend a cable, which may be the electrical cable, to lower the UVC/brush apparatus 700 into the well in one direction by gravity and to retract the electrical cable to raise the UVC/brush apparatus from the well in the opposite direction. The annular gear 940 may be driven by an electric reel motor or drive or the like. The cord reel system 900 may be controlled to lower and raise the UVC/brush apparatus at predetermined rates according to dose-response studies. The cord reel system 900 is an example of an automated hoist/winch/reel for moving the UVC/brush apparatus 700 up and down the well. It is part of the system for cleaning the well which includes the UVC/brush apparatus 700.

Figure 12:
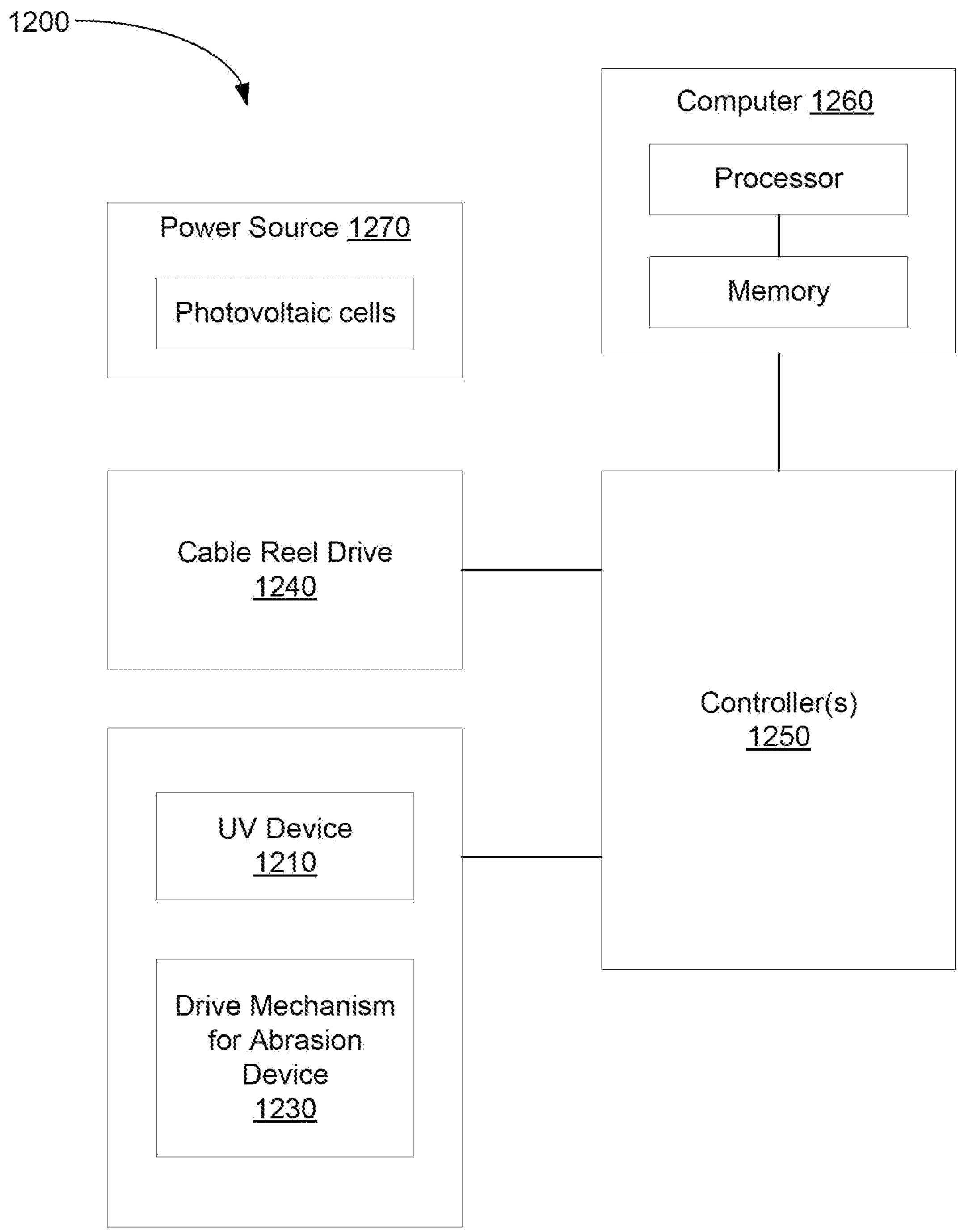
FIG. 12 is a block diagram schematically illustrating an exemplary control system for operating a UVC/brush apparatus.

FIG. 12 is a block diagram schematically illustrating a control system 1200 for operating a UVC/brush apparatus. The components of the UVC/brush apparatus being controlled may include a UV device 1210 for emitting UV light, a drive mechanism 1230 for rotating and/or vibrating an abrasion device, and a cable reel drive 1240 for rotation to move the UV device 1210 and the drive mechanism 1230 with the driven abrasion device up and down the well. One or more controllers 1250 are configured to control UV emission of the UV device 1210, rotational and/or vibrational drive of the drive mechanism 1230, and rotation of the cable reel drive 1240, individually and independently, or in coordination with each other. A computer 1260 including a processor and a memory is configured or programmed to operate the controller(s) 1250 to control the UVC/brush apparatus. The use of the computer 1260 allows the UVC/brush apparatus to operate as an entirely autonomous, programmable apparatus without any human intervention after a simple initial setup. The controller(s) 1250 and the computer 1260 of the control system 1200 are part of the system for cleaning the well which includes the UVC/brush apparatus 700 and the cord reel system 900.

A power source 1270 supplies power to the UV device 1210, the drive mechanism 1230, the cable reel drive 1240, the controller(s) 1250, and the computer 1260. The power source 1270 may be a solar power source including photovoltaic cells or the like to provide the power to drive the cord reel system 900 as well as to operate the UV device 710 and the drive mechanism 730 to operate the first wire brush 720 of the UVC/brush apparatus 700. The solar power source also provides power to the controller(s) 1250 and the computer 1260. The solar power source may be a solar panel that is commercially available from numerous suppliers. In this way, the system including the UVC/brush apparatus 700, the cord reel system 900, the controller(s) 1250, and the computer 1260 can operate autonomously in remote locations without concern for lack of a power source.

Figure 13:
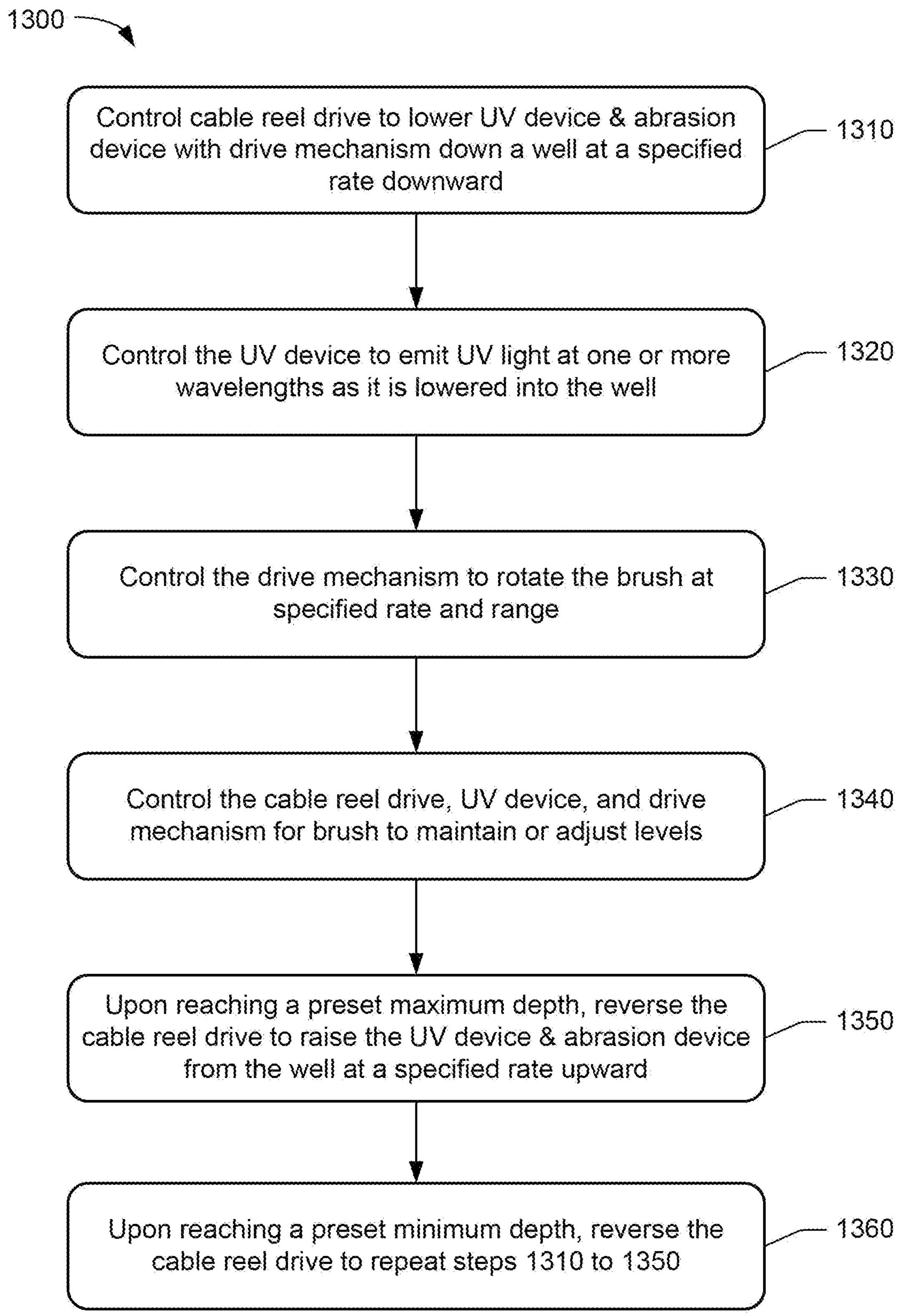
FIG. 13 is a flow diagram illustrating an example of a process for controlling operation of a UVC/brush apparatus.

FIG. 13 is a flow diagram 1300 illustrating an example of a process for controlling operation of a UVC/brush apparatus. In step 1310, the cable reel drive 1240 is driven to extend the cable to lower the UV device 1210 and the drive mechanism 1230 with the abrasion device downward into a well at a specified rate downward. For instance, the rate may be 6 to 18 inches per minute, or 16 to 42 inches per minute, or 36 to 72 inches per minute. In step 1320, the UV device is activated to emit UV light at one or more wavelengths (e.g., 185 nm and/or 254 nm) as it is lowered into the well. In step 1330, the abrasion device such as a wire brush is driven in rotation (e.g., at 9 rpm between ±540°) as it is lowered into the well. In step 1340, the controller 1250 may be programmed to maintain or change any one or more of the rotational speed of the cable reel drive 1240 to extend and/or raise the cable within the well and the rotational speed and/or range of rotation of the wire brush. In step 1350, after the UV device 1210 and the abrasion device have reached a preset maximum depth, typically at some distance before reaching the bottom of the well, the cable reel drive 1240 is driven in reverse to raise the UV device 1210 and the drive mechanism 1230 with the abrasion device upward from the well at a specified rate upward. The controller 1250 may be programmed to maintain or change any one or more of the rotational speed of the cable reel drive 1240 to retract the cable up from the well and the rotational speed and/or range of the wire brush. In step 1360, after the UV device 1210 and the abrasion device have reached a preset minimum depth, the cable reel drive 1240 is driven in reverse to repeat steps 1310 to 1350.

Figure 14:
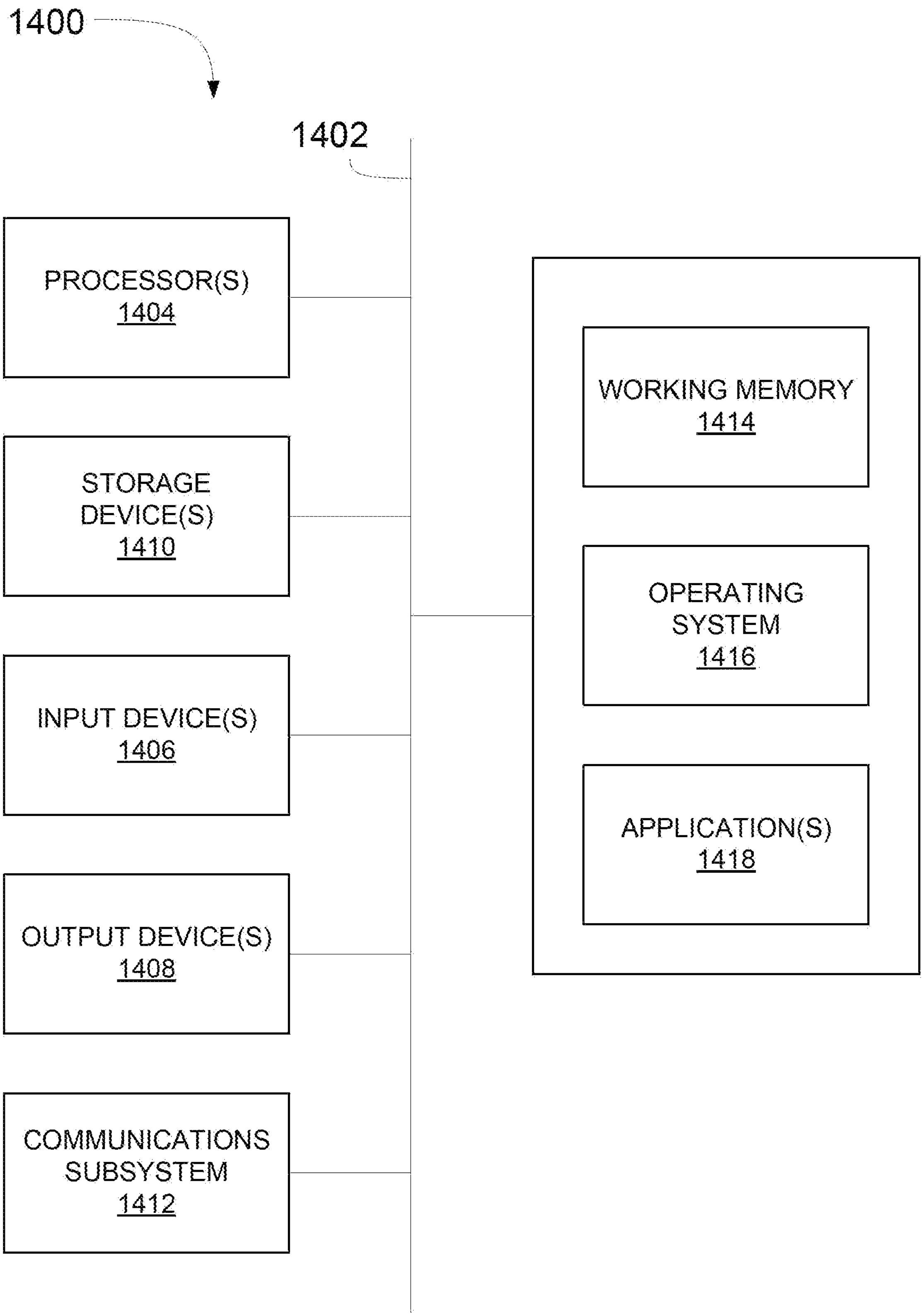
FIG. 14 depicts an exemplary computer system or device configured for use with the well cleaning system including the UVC/brush apparatus, the cord reel system, and the control system according to an embodiment of the present invention.

FIG. 14 depicts an exemplary computer system or device configured for use with the well cleaning system including the UVC/brush apparatus 700, the cord reel system 900, and the control system 1200 according to an embodiment of the present invention. The computer device 1400 of FIG. 14 is shown comprising hardware elements that may be electrically coupled via a. bus 1402 (or may otherwise be in communication, as appropriate). The hardware elements may include a processing unit with one or more processors 1404, including without limitation one or more general-purpose processors and/or one or more special-purpose processors (such as digital signal processing chips, graphics acceleration processors, and/or the like); one or more input devices 1406, which may include without limitation a remote control, a mouse, a keyboard, and/or the like; and one or more output devices 1408, which may include without limitation a presentation device (e.g., controller screen), a printer, and/or the like. Input to the computer system 1400 may be provided by analog-to-digital converters and any other measurement devices into digital form for storage and/or processing. Separate external analog-to-digital devices can be attached to the bus 1402 or communication subsystem 1412 to provide measurements in digital form to the computer system 1400. In some cases, an output device 1408 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 1400 to a user. Output from the computer system 1400 may be provided to digital-to-analog converters to send control signals from the computer to the delivery valves 240 (and optionally the temperature control unit 290 and/or the gate valve 218) and any other mechanisms used in other embodiments. Digitally controlled motors or actuators may be attached to the bus 1402 or communication subsystem 1412 for digital control by the computer.

The computer system 1400 may further include (and/or be in communication with) one or more non-transitory storage devices 1410, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1400 can also include a communications subsystem 1412, which may include without limitation a modem, a network card (wireless and/or wired), an infrared communication device, a wireless communication device and/or a chipset such as a Bluetooth device, 802.11 device, Wi-Fi device, WiMAX device, cellular communication facilities such as GSM (Global System for Mobile Communications), W-CDMA (Wideband Code Division Multiple Access), LTE (Long Term Evolution), and the like. The communications subsystem 1412 may permit data to be exchanged with a network (such as the network described below, to name one example), other computer systems, controllers, and/or any other devices described herein. In many embodiments, the computer system 1400 can further comprise a working memory 1414, which may include a random access memory and/or a read-only memory device, as described above.

The computer device 1400 also can comprise software elements, shown as being currently located within the working memory 1414, including an operating system 1416, device drivers, executable libraries, and/or other code, such as one or more application programs 1418, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 1410 described above. In some cases, the storage medium might be incorporated within a computer system, such as computer system 1400. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1400 and/or might take the form of source and/or installable code, which, upon compilation and/or installation on the computer system 1400 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 1400) to perform methods in accordance with various embodiments of the disclosure. According to a set of embodiments, some or all of the procedures of such methods are performed by the computer system 1400 in response to processor 1404 executing one or more sequences of one or more instructions (which might be incorporated into the operating system 1416 and/or other code, such as an application program 1418) contained in the working memory 1414. Such instructions may be read into the working memory 1414 from another computer-readable medium, such as one or more of the storage device(s) 1410. Merely by way of example, execution of the sequences of instructions contained in the working memory 1414 may cause the processor(s) 1404 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 1400, various computer-readable media might be involved in providing instructions/code to processor(s) 1404 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1410. Volatile media may include, without limitation, dynamic memory, such as the working memory 1414.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 1404 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1412 (and/or components thereof) generally can receive signals, and the bus 1402 then can carry the signals (and/or the data, instructions, and the like, carried by the signals) to the working memory 1414, from which the processor(s) 1404 retrieves and executes the instructions. The instructions received by the working memory 1414 may optionally be stored on a non-transitory storage device 1410 either before or after execution by the processor(s) 1404.

It should further be understood that the components of computer device 1400 can be distributed across a network. For example, some processing may be performed in one location using a first processor while other processing may be performed by another processor remote from the first processor. Other components of computer system 1400 may be similarly distributed. As such, computer device 1400 may be interpreted as a distributed computing system that performs processing in multiple locations. In some instances, computer system 1400 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 612-bit, 256-bit, 128-bit, 64-bit, 32-bit, or 16-bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

As will be appreciated by one of ordinary skill in the art, the present invention may be embodied as an apparatus (including, for example, a system, a machine, a device, and/or the like), as a method (including, for example, a business process, and/or the like), as a computer-readable storage medium, or as any combination of the foregoing.

The present well cleaning system may be desirable to any government or commercial entity that manages groundwater wells (levee or dam relief wells, monitoring wells, etc.). Government agencies that may have particular interest are USACE (levee and dam relief wells, monitoring wells), EPA (monitoring wells, in-situ remediation wells), DOE (monitoring wells), and USGS (monitoring wells). Commercial entities that sell well-cleaning services to private customers or municipalities may also benefit from the present invention.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

Embodiments of the invention can be manifest in the form of methods and apparatuses for practicing those methods. As compared to traditional manual process of rehabilitating a well affected by fouling, the benefits of implementing this technology include continuous and autonomous treatment and prevention, eliminating potential danger to personnel, preventing recolonization or regrowth, and significantly reducing the cost.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A system for cleaning a well, the system comprising:

(i) an ultraviolet (UV) light emitting device; (ii) a first brush connected with an abrasion device motor to drive the first brush in rotation around a longitudinal axis of the first brush;

a cable reel and a cable connected with (i) the UV light emitting device to power the UV light emitting device, to lower the UV light emitting device into the well, and to raise the UV light emitting device from the well; said cable reel and said cable connected with (ii) the first brush and the abrasion device motor, to power the abrasion device motor, to lower the first brush and the abrasion device motor into the well, and to raise the first brush and the abrasion device motor from the well, and a second brush connected with the cable, the UV light emitting device being disposed between the first brush and the second brush.

2. The system of claim 1, wherein the second brush is a passive brush which is not directly driven in rotation.

3. The system of claim 1, wherein the UV light emitting device is configured to emit UVC radiation at least one of two wavelengths: 185 nm and 254 nm.

4. A method for cleaning a well, the method comprising:

lowering, into the well, (i) an ultraviolet (UV) light emitting device; and (ii) a first brush which is connected with an abrasion device motor to drive the first brush in rotation around a longitudinal axis of the first brush, using a cable connected with at least one of (i) the UV light emitting device or (ii) the first brush and the abrasion device motor;

performing (i) emitting UV light from the UV light emitting device while moving the UV light emitting device up and down along a depth of the well, (ii) driving the first brush in rotation around the longitudinal axis of the first brush while moving the first brush and the abrasion device motor up and down along the depth of the well, and activating the abrasion device motor to rotate the first brush by $\pm\theta$, $\theta$ being less than 540° while moving the first brush and the abrasion device motor up and down along the depth of the well.

5. The method of claim 4, wherein a second brush is connected with the cable which is connected with the UV light emitting device and the first brush, the UV light emitting device being disposed between the first brush and the second brush, the method further comprising:

moving the second brush connected with the cable up and down along the depth of the well;

wherein a longitudinal axis of the second brush coincides with the longitudinal axis of the first brush.

6. The method of claim 5, further comprising:

connecting the second brush to the cable as a passive brush which is not directly driven in rotation.

7. The method of claim 4, further comprising:

emitting UVC radiation from the UV light emitting device, while moving at least the UV light emitting device up and down along the depth of the well, at least one of two wavelengths: 185 nm and 254 nm.

8. The method of claim 4, wherein the cable comprises an electrical cable which is connected with the UV light emitting device, the first brush, and the abrasion device motor, the method further comprising:

supplying electrical power to the UV light emitting device and the abrasion device motor through the cable which bears a weight of the UV light emitting device, the first brush, and the abrasion device motor while moving the UV light emitting device, the first brush, and the abrasion device motor up and down along the depth of the well.

9. The method of claim 4, wherein the cable is connected to a reel, the method further comprising:

rotating the reel driven by a reel motor to move the cable to lower at least one of (i) the UV light emitting device or (ii) the first brush and the abrasion device motor, into the well and to raise at least one of (i) the UV light emitting device or (ii) the first brush and the abrasion device motor, from the well.

10. The method of claim 9, further comprising:

operating a controller programmed by a computer to control at least one of (i) UV emission of the UV light emitting device or (ii) the abrasion device motor to drive the first brush in rotation, and to control the reel motor driving the reel to move the cable to lower at least one of (i) the UV light emitting device or (ii) the first brush and the abrasion device motor into the well and to raise at least one of (i) the UV light emitting device or (ii) the first brush and the abrasion device motor from the well.

11. The method of claim 10, further comprising:

supplying, using a solar power source, power to at least one of (i) the UV light emitting device or (ii) the abrasion device motor, and to the reel motor, the controller, and the computer.

12. A system for cleaning a well, the system comprising:

an ultraviolet (UV) light emitting device;

a first abrading device connected with the UV light emitting device;

an abrasion device motor connected to the first abrading device to drive the first abrading device to abrade an interior surface of the well; and an electrical cable connected with the UV light emitting device and the first abrading device to lower the UV light emitting device and the first abrading device into the well and raise the UV light emitting device and the first abrading device from the well, and to supply electrical power to the UV light emitting device and the abrasion device motor.

13. The system of claim 12, further comprising:

a second abrading device connected with the UV light emitting device which is disposed between the first abrading device and the second abrading device, the second abrading device being a passive abrading device which is not directly power-driven by a powered device.

14. The system of claim 1, wherein the abrasion device motor is configured to rotate the first brush by $\pm\theta$, $\theta$ being less than 540°.

* * * * *